United States Patent [19]
Guillou et al.

[11] Patent Number: 5,718,757
[45] Date of Patent: Feb. 17, 1998

[54] NEW BINDING PHASE FOR PHOSPHOMAGNESIUM CEMENTS AND THEIR USE FOR THE PREPARATION OF MORTARS

[75] Inventors: Bruno Le Guillou, Pierrefitte-Sur-Seine; Gilles Orange, Paris, both of France

[73] Assignee: Rhone-Poulenc Chimie, Courbevoie, France

[21] Appl. No.: 753,858

[22] Filed: Dec. 3, 1996

[30] Foreign Application Priority Data

Dec. 8, 1995 [FR] France ................... 95 14538

[51] Int. Cl.$^6$ ................... C04B 12/02
[52] U.S. Cl. ................... 106/691; 106/690; 106/819; 106/823; 106/711; 423/305; 423/306
[58] Field of Search ................... 106/690, 691, 106/711, 819, 823; 423/305, 306

[56] References Cited

U.S. PATENT DOCUMENTS

| | | | |
|---|---|---|---|
| 2,391,493 | 12/1945 | Wainer | 106/104 |
| 2,675,322 | 4/1954 | Watts | 106/38.3 |
| 3,821,006 | 6/1974 | Schwartz | 106/85 |
| 3,923,534 | 12/1975 | Cassidy | 106/691 |
| 4,505,752 | 3/1985 | Sherif et al. | 106/691 |
| 5,518,541 | 5/1996 | Fogel | 106/691 |

FOREIGN PATENT DOCUMENTS

| | | | |
|---|---|---|---|
| 0 219 952 | 9/1986 | European Pat. Off. | C04B 28/34 |
| 1 300 858 | 8/1969 | Germany. | |
| 024 815 | 1/1995 | Japan. | |

*Primary Examiner*—Michael Marcheschi
*Attorney, Agent, or Firm*—Andrew M. Solomon

[57] ABSTRACT

The invention relates to a phosphomagnesium cement obtained by mixing water and a binding phase based on at least one phosphorus compound, at least one magnesium compound and at least one inorganic compound, characterized in that the inorganic compound is introduced in the form:- either of particles (1) of size smaller than 0.1 μm,- or of aggregates (2) of size smaller than 0.1 μm,- or of agglomerates (3) capable of deagglomerating at least partially during the mixing of the said binding phase and of water, into particles of size smaller than 0.1 μm or into aggregates of size smaller than 0.1 μm.

9 Claims, No Drawings

NEW BINDING PHASE FOR PHOSPHOMAGNESIUM CEMENTS AND THEIR USE FOR THE PREPARATION OF MORTARS

The invention relates to a new phosphomagnesium cement in which the binding phase includes a phosphorus compound, a magnesium compound and an inorganic compound, the said compound being introduced in a specific form.

The preparation of a cement of phosphomagnesium type involves mixing the binding phase with water and optionally granulates.

During this mixing and before the cement has solidified a demixing phenomenon is observed: the solid constituents of the cement, in particular the granulates, tend to flocculate under the effect of gravity at the bottom of the cement, leaving at the surface a layer consisting essentially of water.

This phenomenon has serious consequences on the final characteristics of the cement: in fact, the material is less dense and less homogeneous, resulting in weakened mechanical properties, a mediocre aesthetic appearance, a reduced durability and a greater porosity.

In the case where the mortar or the grout is deposited onto a porous support a phenomenon of absorption of water by the support is also observed. Here too this absorption results in a material exhibiting poor properties and in particular poor adhesiveness to the support.

This phenomenon is all the more noticeable when the water content is high, which is the case, for example, with cement compositions of the grout type.

The objective of the present invention is therefore to propose a phosphomagnesium cement producing mortars or grouts which do not exhibit any demixing phenomenon or any phenomenon of water absorption by a support, while retaining the advantages of the phosphomagnesium mortars and grouts, namely short setting times and fast curing.

Another aim is to propose phosphomagnesium cements exhibiting improved mechanical properties and aesthetic appearance.

To these ends the subject-matter of the present invention is a phosphomagnesium cement obtained by mixing water and a binding phase based on at least one phosphorus compound, on at least one magnesium compound and on at least one inorganic compound, characterized in that the inorganic compound is introduced in the form:

either of particles (1) of size smaller than 0.1 µm, or of aggregates (2) of size smaller than 0.1 µm, or of agglomerates (3) capable of deagglomerating, at least partially, during the mixing of the said binding phase and water, into particles of size smaller than 0.1 µm or into aggregates of size smaller than 0.1 µm.

Another subject-matter of the invention relates to the use of this cement for the production of mortars or grouts.

Finally, another subject-matter of the invention is a composite material based on such a cement and fibres.

Other advantages and characteristics of the invention will appear more clearly on reading the description and the examples which will follow.

The invention relates first of all to a phosphomagnesium cement obtained by mixing water and a binding phase based on at least one phosphorus compound, on at least one magnesium compound and on at least one inorganic compound, characterized in that the inorganic compound is introduced in the form:

either of particles (1) of smaller than 0.1 µm, or of aggregates (2) of size smaller than 0.1 µm, or of agglomerates (3) capable of deagglomerating, at least partially, during the mixing of the said binding phase and water, into particles of size smaller than 0.1 µm or into aggregates of size smaller than 0.1 µm.

Cements conventionally consist of a binding phase including, if appropriate, the additives which are usual in the field. Although a different term may be employed for defining cements including granulates, besides the said binding phase and the optional additives, for greater convenience in the description, the sole term of "cement" will be employed for naming both these types of compositions.

The cement according to the invention is a phosphomagnesium cement. The binding phase of such cement therefore includes a phosphorus-based first constituent and a magnesium-based second constituent.

With regards to the phosphorus-based first constituent, any phosphorus compounds can be employed, provided that they include phosphorus pentoxide, available directly or in the form of a precursor.

Thus, phosphorus-based compounds which may be mentioned—no limitation being intended thereby—are phosphorus pentoxide, phosphoric acid or derivatives such as orthophosphoric acid, pyrophosphoric acid, polyphosphoric acid or salts of such acids such as aluminium, calcium, potassium, magnesium or ammonium phosphates, hydrogenphosphates, orthophosphates, pyrophosphates, polyphosphates, tripolyphosphates, tetrapolyphosphates, or mixtures thereof.

It should be noted that phosphorus-containing wastes from industries which manufacture fertilizers or from steel plants (steel pickling, treatment to reduce corrosion) can be employed as phosphorus-based constituents.

According to a particular embodiment of the invention the salts of the abovementioned phosphorus-based acids are employed.

Potassium, magnesium or ammonium phosphates or hydrogenphosphates or mixtures thereof are preferably used. Still more preferably, the phosphorus-based constituent is ammonium dihydrogenphosphate, optionally mixed with ammonium tripolyphosphate.

The phosphorus-based constituent may be in a liquid, or preferably solid, form.

According to a first alternative form the phosphorus-based constituent is in the form of particles the particle size of which is more particularly at most 300 µm. It should be noted that this value is not critical and that, while it is possible to employ constituents whose particle size is greater than 300 µm, grinding before incorporation into the composition according to the invention may be desirable.

According to a second alternative form the constituent is employed in a form which is adsorbed onto a porous support. Examples of supports which may be mentioned are diatomaceous earths, clay, bentonite, silica and alumina. The adsorption is performed in a manner known per se. Thus, conventionally, the phosphorus-based constituent, in solution or in suspension, is brought into contact with the support, with stirring, and the resulting suspension is then heated so as to evaporate off the excess liquid. This operation can also be carried out by impregnating the support in a drum or on a rotating disc.

The second component of the binding phase is at least one magnesium-based constituent.

Any magnesium-based compound is suitable for the present invention, provided that it reacts with the first constituent in the presence of water.

To give an example, the following constituents may be mentioned as suitable for making use of the invention: magnesium oxide, magnesium hydroxide and magnesium carbonate.

A magnesium oxide-based constituent is preferably employed. So-called "dead burned" magnesia, usually obtained after calcining magnesium carbonate at temperatures higher than 1200° C. is especially suitable.

Advantageously, the said magnesium oxide can be used in pure form or may optionally include at least one element of the calcium, silicon, aluminium or iron type; these elements being generally present in oxide or hydroxide form. An example of this type of compound which may be mentioned is dolomite, a mixture including especially magnesium oxide and calcium oxide.

If magnesium oxide is employed in pure form, the purity of the said oxide is at least 80%.

A magnesium-based constituent whose specific surface is lower than 2 $m^2/g$ is preferably employed. More particularly, the specific surface is lower than 1 $m^2/g$.

Furthermore, the particle size of the said constituent is generally between 10 and 500 µm. Employing compounds whose particle size is outside the abovementioned range could be envisaged, but this does not provide any particular advantages. Thus, if the particle size is greater than 500 µm, a grinding stage prior to the incorporation into the composition may be necessary. Furthermore, if the particle size of the said constituents were smaller than 10 µm, a modification of the properties of the composition brought into contact with water could be observed. It is possible, in particular, to observe an increase in the setting rate of the cement, unless the content of setting-retardant agent is increased, which will be discussed in the description which follows. As a result of this, the cement obtained according to the process of the present invention could be less advantageous from the viewpoint of use or from the economic viewpoint.

It should be noted that if both the constituents described above are in solid form, they may optionally be subjected to a grinding stage before they are employed in the process according to the invention.

The proportion of the magnesium-based constituent (expressed as weight of MgO), in relation to that of the phosphorus-based constituent (expressed as weight of $P_2O_5$) is more particularly between 1 and 3.

The essential characteristic of the cement according to the invention is that, in addition to the phosphorus and magnesium compounds, its binding phase includes at least one inorganic compound exhibiting particular conditions with regard to the form of the objects of which it is constituted and the size of these objects.

According to a first embodiment of the invention the binding phase is based on phosphorus and magnesium compounds and on at least one inorganic compound, the latter being introduced into the cement in the form of particles (1) of size smaller than 0.1 µm. Particles (1) are intended to mean indivisible objects which are in a standardized, unit form.

According to a second embodiment of the invention the binding phase is based on phosphorus and magnesium compounds and on at least one inorganic compound, the latter being introduced into the cement in the form of aggregates (2). Aggregates (2) are intended to mean objects formed by the accumulation of a number of smaller objects which themselves are in a standardized, unit form, such as the particles defined above. The aggregates introduced are of a size smaller than 0.1 µm. These aggregates are in general divisible with great difficulty, and in particular indivisible in a mixture of the magnesium and phosphorus compounds and water.

According to a third embodiment of the invention the binding phase is based on phosphorus and magnesium compounds and on at least one inorganic compound, the latter being introduced in the form of agglomerates (3). Agglomerates (3) are intended to mean objects formed by the accumulation of a number of smaller objects: particles and/or aggregates. According to the invention, when they are mixed with the magnesium and phosphorus compounds and water, the agglomerates introduced must be capable, at least partially, of deagglomerating into the objects of which they are constituted (particles or aggregates), in order to produce, in the mixture, objects of size smaller than 0.1 µm.

The invention consists in having noticed that, in the cement produced by the mixing of the binding phase (phosphorus compound+magnesium compound+inorganic compound), and water, the inorganic compound of the binding phase must be in the form of objects of size smaller than 0.1 µm, the said objects (particles, aggregates) having been introduced as such or in agglomerated form. In this latter case their mixing with the phosphorus and magnesium compounds and the water must result in their deagglomeration.

The inorganic compound may be introduced as a mixture of these three forms (particles, aggregates, agglomerates).

In the text, size is intended to mean the mean size of the particles, aggregates or agglomerates. This size is measured by transmission electron microscopy (TEM).

The inorganic compound is preferably introduced in the form of agglomerates which are at most 60 µm, advantageously at most 20 µm in size. Such a size of the agglomerates allows easier handling of the inorganic compound.

The inorganic compound may be chosen from $SiO_2$, $TiO_2$, $Al_2O_3$, $ZrO_2$, $Cr_2O_3$, $CaCO_3$, talc, mica, kaolin, wollastonite, bentonite and metakaolin. These may be crystalline or amorphous compounds obtained, for example, by grinding.

It is especially silica and, in particular, precipitated silica.

The silica introduced may be advantageously in the form of agglomerates of mean size smaller than 50 µm, the said agglomerates consisting of aggregates of mean size smaller than 0.1 µm.

It may be, for example, T38AB precipitated silica marketed by Rhône-Poulenc, which is in the form of agglomerates of size smaller than 50 µm. These agglomerates are divided up in the mixture of binding phase and water in the form of aggregates of size smaller than 0.1 µm. These aggregates, which themselves are made up of elementary particles of 15 nm size, are indivisible in the binding phase/water mixture.

Ground silica smoke or pyrogenic silica can also be employed.

The inorganic compound content of the binding phase of the cement according to the invention is generally between 1 and 15 parts by weight per 100 parts of the binding phase, preferably between 1 and 10 parts.

The binding phase of the cement according to the invention may additionally include a setting-retardant agent.

This agent is chosen more particularly from compounds capable of complexing magnesium.

These latter compounds may be especially carboxylic acids such as citric, oxalic and tartaric acids, acids, esters or salts containing boron, acids, esters or salts containing phosphorus, like sodium tripolyphosphate, ferrous sulphate, sodium sulphate and lignosulphate, zinc chloride, copper acetate, sodium gluconate, sodium cellulose acetate sulphate, the product of the reaction of formaldehyde with aminolignosulphate, dialdehyde starch, N,N-dimethyloldihydroxyethyleneurea, silicofluorides, tall oil and sucrose, these compounds being taken alone or in a mixture.

Carboxylic acids and, preferably, acids, esters or salts containing boron are preferably employed, alone or in a mixture.

Thus, in this latter category of compounds it is possible to mention, without a limitation being intended, boric acid and its salts such as the salts of alkali metals like sodium (borax), and amine or ammonium salts. Boric acid esters are also suitable for making use of the invention, like trialkyloxy borates and triaryloxy borates.

According to a particular embodiment the additive is used in the form of a powder whose mean diameter is from 10 to 200 µm.

The quantity of setting-retardant agent is at most 10 parts by weight per 100 parts by weight of the abovementioned three constituents (phosphorus and magnesium compounds and inorganic compound). This quantity is preferably at most 5 parts by weight, based on the same reference.

The cements obtained using the mixture according to the invention may additionally include granulates as constituent components.

Examples of such compounds which may be mentioned are sand, silica, alumina, zirconium oxide, raw dolomite, chromium ore, limestone, clinker, vermiculite, mica, gypsum, cellulose and perlite.

Fly ash or condensed silica smoke can similarly be employed. The fly ash which can be employed is, in general, silicoaluminous ash originating especially from the combustion in heating power plants.

The particle size of this ash is usually between 0.5 and 200 µm.

Condensed silica smoke generally has a specific surface of between 20 and 30 $m^2/g$.

Depending on the ulterior application of the cement, the granulates forming part of the composition will be chosen:
either from sand, silica or the other components listed in the above list,
or from fly ash or condensed silica smoke,
or from a mixture of both these types of granulates.

The quantity of granulates in cement according to the invention is usually at most 1000 parts by weight per 100 parts by weight of binding phase.

According to a particular embodiment the quantity of sand, silica or of the other compounds mentioned in the above list is at most 900 parts by weight relative to the same reference as previously.

Similarly, the quantity of condensed silica smoke or of fly ash is preferably at most 100 parts by weight per 100 parts by weight of binding phase.

The cement according to the invention may further include an agent imparting water-repellency.

Finally, the cement according to the invention may include any conventional additives like plasticizers such as sodium lignosulphate and naphthalenesulphonate condensates, naphthalene, tripolyphosphate, sodium hexametaphosphate, ammonium hydrogenphosphate, melamine, aminopropyltriethoxysilane (APTES) alkyl siliconates.

Antifoaming agents may also be constituent components of the cement according to the invention. Antifoams based on polydimethylsiloxanes may be mentioned in particular as an example.

Among agents of this type is also possible to mention silicones in the form of a solution, of a solid, and preferably in the form of a resin, of an oil or of an emulsion, preferably in water. Silicones including essentially M ($RSiO_{0.5}$) and D ($R_2SiO$) units are very particularly suitable. In these formulae the radicals R, which are identical or different, are chosen more particularly from hydrogen and alkyl radicals containing 1 to 8 carbon atoms, the methyl radical being preferred. The number of units is preferably between 30 and 120.

Sizing and thickening such as cellulose, guar gum and starch may also been added.

In general, the quantity of these additives in the cement is at most 10 parts by weight per 100 parts by weight of binding phase. The quantity of additives is preferably at most 5 parts by weight.

The quantity of water to be introduced for the preparation of the cement according to the invention is such that a homogeneous and malleable plastic paste is obtained. It depends on the ulterior application of the cement. In fact, if it is desired to produce internal linings for pipe work, the composition is generally more cohesive than a cement intended to form a ground surfacing or for the preparation of slabs or panels.

The water content is generally at most 50% by weight, preferably between 35 and 40%, relative to the weight of binding phase.

The cements according to the invention have the advantage of not exhibiting any demixing phenomenon.

The mixing of the binding phase and water can be performed by any appropriate method. It can thus be carried out by introducing all the constituent components of the cement and water, simultaneously or separately. According to this latter possibility a composition including the binding phase, the granulates, if appropriate the retardant agent and all or part of the abovementioned possible additives, generally solid ones, is generally prepared. The said composition is next mixed with water, the latter including, if such is the case, the components which were not introduced in the preceding step of preparation of the composition, like the liquid additives in particular.

It should be noted that it is also possible to envisage using more or less complete mixtures of the constituent components of the cement.

The most important point of the process is that it is implemented so as to obtain a distribution of all the constituent components which is as homogeneous as possible in the bulk of the cement.

The mixing of the constituent components is done by any known means and preferably in shearing conditions, for example by employing a blending mixer.

The mixing operation is advantageously performed at a temperature close to the ambient temperature.

The cements according to the invention can be employed as grouts or mortars, depending on the proportions of water and of aggregates employed and on the nature of these aggregates.

They can be employed as mortars for repairing and sealing, for example in the quick repairing of roads, bridges and airport runways. Accordingly, they are employed for filling tracks, holes or for covering damaged regions, as well as for repairing reinforced concrete structures. In fact, in addition to good adhesiveness to so-called Portland cements, the mortars or grouts have good mechanical properties of flexural and compressive strength, making them particularly suited for applications of this type.

With respect to their high hardness and their resistance to abrasion, they can similarly be employed as floor surfacings and pipework linings which are resistant to chemical attacks.

They can also be employed for producing panels in general and in particular panels for internal or external cladding. For this purpose the composition obtained is cast in an appropriate mould, to give slabs or panels. It can also be sprayed. The moulded or sprayed products are next dried, advantageously at a temperature close to the ambient temperature.

Lastly, by starting with the these cements it is possible to prepare refractory compounds which have to withstand high temperatures, such as sealing mortars for chimney ducts or fire-resistant panels.

Finally, the present invention relates to a composite material based on the cement described above and fibres.

As an example of fibres that are suitable for obtaining the said material it is possible to mention polypropylene, polyester, polyaramid fibres like, for example, KEVLAR®, carbon fibres, polyamide, polyvinyl alcohol or amorphous cast iron tapes.

Glass fibres can similarly be employed for obtaining the composite material according to the invention. Any glass fibres usually employed in cements are suitable. It is therefore possible to use alkali-resistant fibres like the special glass fibres obtained especially by treatment with zirconium, as can soda-lime glass fibres. However, advantageously, standard glass fibres are also suitable for obtaining composite materials according to the invention. This is the case with conventional glasses like borosilicate glasses, which are usually destroyed in an alkaline medium.

The fibres have lengths that vary from 5 mm to several hundred millimeters.

The quantity of fibres in the composite material according to the invention is between 1 and 10% relative to the weight of binding phase.

The composite materials according to the invention are obtained by mixing the cement as described above with the fibres. The mixing takes place in the same conditions for preparing the cement and they will not therefore be repeated here. The composition thus obtained is cast in a suitable mould to give slabs or panels. The moulded products are subsequently dried, advantageously at a temperature close to he ambient temperature.

The composite materials according to the invention can be employed especially to give facing panels. The advantage of these materials lies in their speed of manufacture, and chiefly in their speed of drying.

The following examples illustrate the invention without, however, limiting its scope.

EXAMPLES

Methods of Controlling the Properties of the Cement

Measurement of the Workability

The workability is measured with the aid of a vibrating table on a standardized mortar (NFP 15403). The mortar is introduced into a frustoconical mould and then demoulded shaken with the aid of the vibrating table. The workability is the ratio of the diameter of the frustoconical mould to that of the mortar after collapse. It is expressed as a percentage.

Measurement of the Setting Time

The setting time is measured with the aid of an automatic Vicat type apparatus according to NFP standard 15431.

Measurement of the Mechanical Properties

Prismatic test pieces (4×4×16 cm$^3$) are produced by casting the mortar or the grout in standard mild steel moulds. These test pieces are demoulded 1 hour after the setting time and are dried at ambient temperature. The mechanical properties are tested on these test pieces.

The tests are carried out in three-point flexure (NFP 18407) on six half-test pieces and in compression (NFP 15451) on six half-test pieces, with the aid of a hydraulic testing machine (200 kN).

Measurement of Ductility

The ductility is estimated from force/displacement recordings obtained for the flexural tests.

Measurement of Adhesion

A 1-cm coating is produced by starting with the mortar or the grout to be tested on a concrete slab. One day later coring of the dry coating is then performed and a metal stud is adhesively bonded in the hole left by the coring. The stud is then extracted with aid of an extractometer: the force applied in the case of an area of 20 to 25 cm$^2$ determines the adhesion value.

Comparative Example 1: Standard Phosphomagnesium Mortar

A phosphomagnesium mortar is prepared from the following constituents:

25% by weight of binding phase consisting of:
  48.5% by weight of monoammonium phosphate,
  48.5% by weight of magnesium oxide,
  3% by weight of boric acid, which is a retardant agent,
75% by weight of CEN 31 196-1 standardized sand the elementary particles of which are between 100 and 500 μm in size.

Various mortars with different water contents are prepared by mixing the materials defined above with water. The mixing is carried out in the following manner: the materials are mixed in the dry state for 30 s at a low speed (60 rev/min) with the aid of a Hobart type mixer and then water is added in the desired proportion. Mixing is then continued for 1 min 30 s at low speed and then 1 min 30 s at high speed (120 rev/min).

The workability, the relative density and the setting time of these mortars are measured, together with the mechanical properties obtained. The results are collated in Tables 1 and 2.

TABLE 1

| Water/binding phase weight ratio | Workability (%) | Relative density of fresh mortar | Setting time (min) |
|---|---|---|---|
| 0.32 | 7.5 | 1.98 | 32 |
| 0.36 | 30 | 1.95 | 33 |
| 0.4 | 45 | 1.93 | 39 |
| 0.43 | 55 | 1.92 | 41 |

TABLE 2

| Time of measurement | Compressive strength (MPa) | Flexural strength (MPa) |
|---|---|---|
| 1 day | 35 | 6.4 |
| 7 days | 42.5 | 6.9 |
| 28 days | 44 | 7.8 |

An exudation effect is observed during the setting: water rises to the surface of the mortar while the granulates tend to flocculate.

The adhesiveness to a clean concrete slab after 7 days is lower than 5 kg/cm$^2$.

Example 2: Phosphomagnesium Mortar Including a Precipitated Silica

Phosphomagnesium mortars are prepared as in Example 1, except that the binding phase additionally includes silica in a content of 5% by weight relative to the total weight of the binding phase. The silica introduced is a T38AB precipitated silica marketed by Rhône-Poulenc, exhibiting the following characteristics:

agglomerate size: 50 μm aggregate size: smaller than 0.1 μm (both measured by TEM).

When this silica is merely mixed with water, it deagglomerates in the form of its aggregates of size smaller than 0.1 μm.

The conditions for mixing this silica with water and the other constituents of the cement to form a mortar, as defined in Example 1, are more shearing than simple mixing of the silica in water. Consequently, this silica deagglomerates also in the phosphomagnesium mortar and is present in the latter in the form of its aggregates of size smaller than 0.1 μm.

The workability, the relative density and the setting time are measured, together with the mechanical properties of these mortars for various water/binding phase ratios. The results are collated in Tables 3 and 4.

TABLE 3

| Water/binding phase weight ratio | Workability (%) | Relative density of fresh mortar | Setting time (min) |
|---|---|---|---|
| 0.32 | 2.5 | 2.01 | 30 |
| 0.36 | 25 | 1.96 | 30 |
| 0.4 | 35 | 1.96 | 35 |
| 0.43 | 45 | 1.93 | 40 |

TABLE 4

| Time of measurement | Compressive strength (MPa) | Flexural strength (MPa) |
|---|---|---|
| 1 day | 35.6 | 7.1 |
| 7 days | 49 | 8.05 |
| 28 days | 52.5 | 9.5 |

It is found that the mechanical properties are improved.

No exudation effect is observed. No outflow of water is observed even when the mortar is deposited on a porous support such as a concrete slab or when the mortar is subjected to vacuum suction on a Büchner.

The adhesiveness to a clean concrete slab after 7 days is 15.0 kg/cm$^2$. It is greatly improved: the water of the mortar has not been absorbed by the concrete support.

Comparative Example 3: standard phosphomagnesium grout

A phosphomagnesium grout is prepared from the following constituents:

50% by weight of a binding phase consisting of:
 48.5% by weight of monoammonium phosphate
 48.5% by weight of magnesium oxide
 3% by weight of boric acid, which is a retardant agent 50% by weight fly ash of 12 μm mean size.

A grout is prepared by mixing the materials defined above with water in a water/binding phase weight ratio of 0.4. The mixing is carried out as follows: the materials are mixed in the dry state for 30 s at low speed (60 rev/min) and water is then added in the desired proportion. Mixing is then continued for 1 min 30 s at low speed and then 1 min 30 s at high speed (120 rev/min).

The mechanical properties obtained for the grout are measured. The results are collected in Table 5.

TABLE 5

| Time of measurement | Compressive strength (MPa) | Flexural strength (MPa) |
|---|---|---|
| 1 day | 10.9 | 4.8 |
| 28 days | 15 | 5 |

An exudation effect is observed during the setting: water rises to the surface of the grout while the granulates tends to flocculate.

Example 4: phosphomagnesium grout with precipitated silica

A phosphomagnesium grout is prepared as in Example 3, except that the binding phase additionally includes T38AB precipitated silica marketed by Rhône-Poulenc (as in Example 2) in a content of 8% by weight relative to the total weight of the binding phase.

The mechanical properties obtained for the grout are measured. The results are collated in Table 6.

TABLE 6

| Time of measurement | Compressive strength (MPa) | Flexural strength (MPa) |
|---|---|---|
| 1 day | 10.6 | 4.6 |
| 28 days | 17.5 | 6.2 |

There is an improvement in the long-term mechanical properties.

No exudation effect is observed during the setting.

The adhesiveness of the grout to a clean substrate is 13.5 kg/cm$^2$ after 7 days dry and 10.0 kg/cm$^2$ after 7 days dry and 7 days in water.

Comparative Example 5: standard "phosphomagnesium" composite

A phosphomagnesium composite is prepared from the following constituents:

49% by weight of binding phase consisting of:
 48.5% by weight of monoammonium phosphate,
 48.5% by weight of magnesium oxide,
 3% by weight of boric acid, which is a retardant agent, 49% by weight of fine sands (⅓ of sand of 200 μm size (F15), ⅓ of sand of 315 μm size (F25), ⅓ of sand of 600 μm size (F35))

2% by weight of polypropylene fibres.

The composites are prepared by mixing the materials defined above with water. The mixing is carried out as follows: the materials are mixed in the dry state for 30 s at low speed (60 rev/min) and water is then added in a water/binding phase weight ratio of 0.2. Mixing is then continued for 1 min 30 s at low speed and then 1 min 30 s at high speed (120 rev/min). The fibres are then incorporated into the mix at low speed.

The mechanical properties and the ductility obtained for the composite are measured. The results are collated in Table 7.

TABLE 7

| | Flexural strength at 18 days (mPa) | Ductility |
|---|---|---|
| Composite based on polypropylene fibres | 7.5 | good |

An exudation effect is observed during the setting: water rises to the surface of the composite while the granulates tend to flocculate.

Example 6: "phosphomagnesium" composite with precipitated silica

A phosphomagnesium composite is prepared as in Example 5, except that the binding phase additionally includes 5% of T38AB precipitated silica, relative to the total weight of the binding phase.

The mechanical properties and the ductility obtained for the composite are measured. The results are collated in Table 8.

TABLE 8

| | Flexural strength at 18 days (mPa) | Ductility |
|---|---|---|
| Composite based on polypropylene fibres | 8 | high |

No exudation effect is observed during the setting.

Comparative Example 7: phosphomagnesium mortar with nondeagglomerable silica

A phosphomagnesium mortar is prepared which has the same composition as in Example 2, except that T38AB silica employed as inorganic compound in the binding phase is replaced with ZEOSIL® Z160 precipitated silica marketed by Rhône-Poulenc, which in the form of agglomerates of 200 µm mean size.

These silica agglomerates do not deagglomerate when they are merely mixed with water.

It is observed that the mortar prepared from this binding phase results in a demixing and exudation phenomenon.

Comparative Example 8: phosphomagnesium mortar with quartz flour of size greater than 0.1 µm A phosphomagnesium mortar is prepared which has the same composition as in Example 2, except that T38AB silica employed as inorganic compound of the binding phase is replaced with quartz flour (very finely ground sand) which is in the form of particles of mean size greater than 0.1 µm.

It is observed that the mortar prepared from this binding phase results in a demixing and exudation phenomenon.

Comparative Example 9: phosphomagnesium mortar with silica smoke of size greater than 0.5 µm A phosphomagnesium mortar is prepared which has the same composition as in Example 2, except that T38AB silica employed as inorganic compound of the binding phase is replaced with silica smoke which is in the form of particles of mean size greater than 0.5 µm.

It is observed that the mortar prepared from this binding phase results in a demixing and exudation phenomenon.

What is claimed is:

1. A process for the preparation of a phosphomagnesium cement comprising the step of:

mixing water and a binding phase based on at least one phosphorus compound, on at least one magnesium compound and on at least one inorganic compound, wherein the inorganic compound is in the form of:
   either of particles (1) of size smaller than 0.1 µm,
   or of aggregates (2) of size smaller than 0.1 µm,
   or of agglomerates (3) capable of deagglomerating, at least partially, during the mixing of the said binding phase and water, into particles of size smaller than 0.1 µm or into aggregates of size smaller than 0.1 µm.

2. A process according to claim 1, wherein the inorganic compound is in the form of agglomerates which are at most 60 µm in size.

3. A process according to claim 1, wherein the inorganic compound is silica.

4. A process according to claim 3, wherein the silica is in the form of agglomerates of size smaller than 50 µm, the said agglomerates consisting of aggregates of size smaller than 0.1 µm.

5. A process according to claim 1, wherein the inorganic compound comprises $TiO_2$, $Al_2O_3$, $ZrO_2$, $Cr_2O_3$, $CaCO_3$, talc, mica, kaolin, wollastonite, bentonite or metakaolin.

6. A process according to claim 1, wherein the binding phase includes 1 to 15 parts by weight of the inorganic compound per 100 parts of binding phase.

7. A process according to claim 1, having a water content of at most 50% by weight relative to the weight of binding phase.

8. A process for the preparation of a composite material based on a phosphomagnesium cement comprising the steps of:

mixing water and a binding phase based on at least one phosphorus compound, on at least one magnesium compound and on at least one inorganic compound to form a mixture, wherein the inorganic compound is in the form of:
   either of particles (1) of size smaller than 0.1 µm,
   or of aggregates (2) of size smaller than 0.1 µm,
   or of agglomerates (3) capable of deagglomerating, at least partially, during the mixing of the said binding phase and water, into particles of size smaller than 0.1 µm or into aggregates of size smaller than 0.1 µm; and adding fibers to said mixture.

9. A process for the preparation of a composite material according to claim 8, wherein the fibers are added to said mixture in a quantity of between 1 and 10% by weight relative to the weight of the binding phase of the phosphomagnesium cement.

* * * * *